(12) United States Patent
Assfalg et al.

(10) Patent No.: US 11,945,698 B2
(45) Date of Patent: Apr. 2, 2024

(54) MOBILE CONSTRUCTION CRANE COMPRISING A SUPERSTRUCTURE AND AN UNDERCARRIAGE AND ONE OR MORE ELECTRICAL CONSUMERS

(71) Applicant: LIEBHERR-WERK BIBERACH GMBH, Biberach an der Riss (DE)

(72) Inventors: Martin Assfalg, Oggelsbeuren (DE); Michael Eggert, Biberach (DE); Gerhard Schmid, Wolpertswende (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 445 days.

(21) Appl. No.: 17/287,969

(22) PCT Filed: Oct. 24, 2019

(86) PCT No.: PCT/EP2019/078961
§ 371 (c)(1),
(2) Date: Apr. 22, 2021

(87) PCT Pub. No.: WO2020/084026
PCT Pub. Date: Apr. 30, 2020

(65) Prior Publication Data
US 2021/0371254 A1 Dec. 2, 2021

(30) Foreign Application Priority Data
Oct. 25, 2018 (DE) .................. 10 2018 126 632.4

(51) Int. Cl.
*B66C 13/00* (2006.01)
*B60R 16/03* (2006.01)
(Continued)

(52) U.S. Cl.
CPC .............. *B66C 13/12* (2013.01); *B60R 16/03* (2013.01); *B66C 13/22* (2013.01); *B66C 23/84* (2013.01); *B66C 23/26* (2013.01)

(58) Field of Classification Search
CPC ..... B66C 13/12; B66C 13/063; B66C 13/085; B66C 13/105; B66C 13/22; B66C 13/44; B66C 23/905; B66C 23/84; B60R 16/03
See application file for complete search history.

(56) References Cited

U.S. PATENT DOCUMENTS

| 3,190,457 A | 6/1965 | Lindén |
| 2012/0160796 A1* | 6/2012 | Weckbecker ............ B66D 1/22 254/342 |

(Continued)

FOREIGN PATENT DOCUMENTS

| CN | 101054062 A | 10/2007 |
| CN | 201071264 Y | 6/2008 |

(Continued)

OTHER PUBLICATIONS

Intellectual Property India, Examination Report Issued in Application No. 202117023149, dated Oct. 18, 2022, 6 pages.

(Continued)

*Primary Examiner* — Emmanuel M Marcelo
(74) *Attorney, Agent, or Firm* — McCoy Russell LLP

(57) ABSTRACT

The invention relates to a mobile construction crane comprising a superstructure and an undercarriage, wherein one or more electrical consumers are provided in or at the superstructure, wherein a supply of the one or more electrical consumers with electrical energy takes place by at least one current generator installed in the undercarriage.

14 Claims, 1 Drawing Sheet

(51) Int. Cl.
  *B66C 13/12*   (2006.01)
  *B66C 13/22*   (2006.01)
  *B66C 23/84*   (2006.01)
  *B66C 23/26*   (2006.01)

(56) References Cited

U.S. PATENT DOCUMENTS

| 2018/0056902 | A1 |   | 3/2018 | Trinkner et al. |
| 2018/0244508 | A1 |   | 8/2018 | Kösterke et al. |
| 2022/0055870 | A1 | * | 2/2022 | Assfalg ................ B65H 75/403 |

FOREIGN PATENT DOCUMENTS

| CN |   202465124 | U  |   | 10/2012 |            |
| DE |     2020239 | A1 |   | 11/1971 |            |
| DE | 102012201140 | A1 | * | 8/2013  | ............ B66C 23/40 |
| DE | 102012201140 | A1 |   | 8/2013  |            |
| DE | 102015116506 | A1 |   | 3/2017  |            |
| EP |     3284626 | A1 |   | 2/2018  |            |
| GB |     1045797 | A  |   | 10/1966 |            |
| WO | WO-2012084508 | A2 | * | 6/2012  | ................ B60L 1/20 |

OTHER PUBLICATIONS

ISA European Patent Office, International Search Report Issued in Application No. PCT/EP2019/078961, dated Jan. 30, 2020, Germany, 2 pages.

* cited by examiner

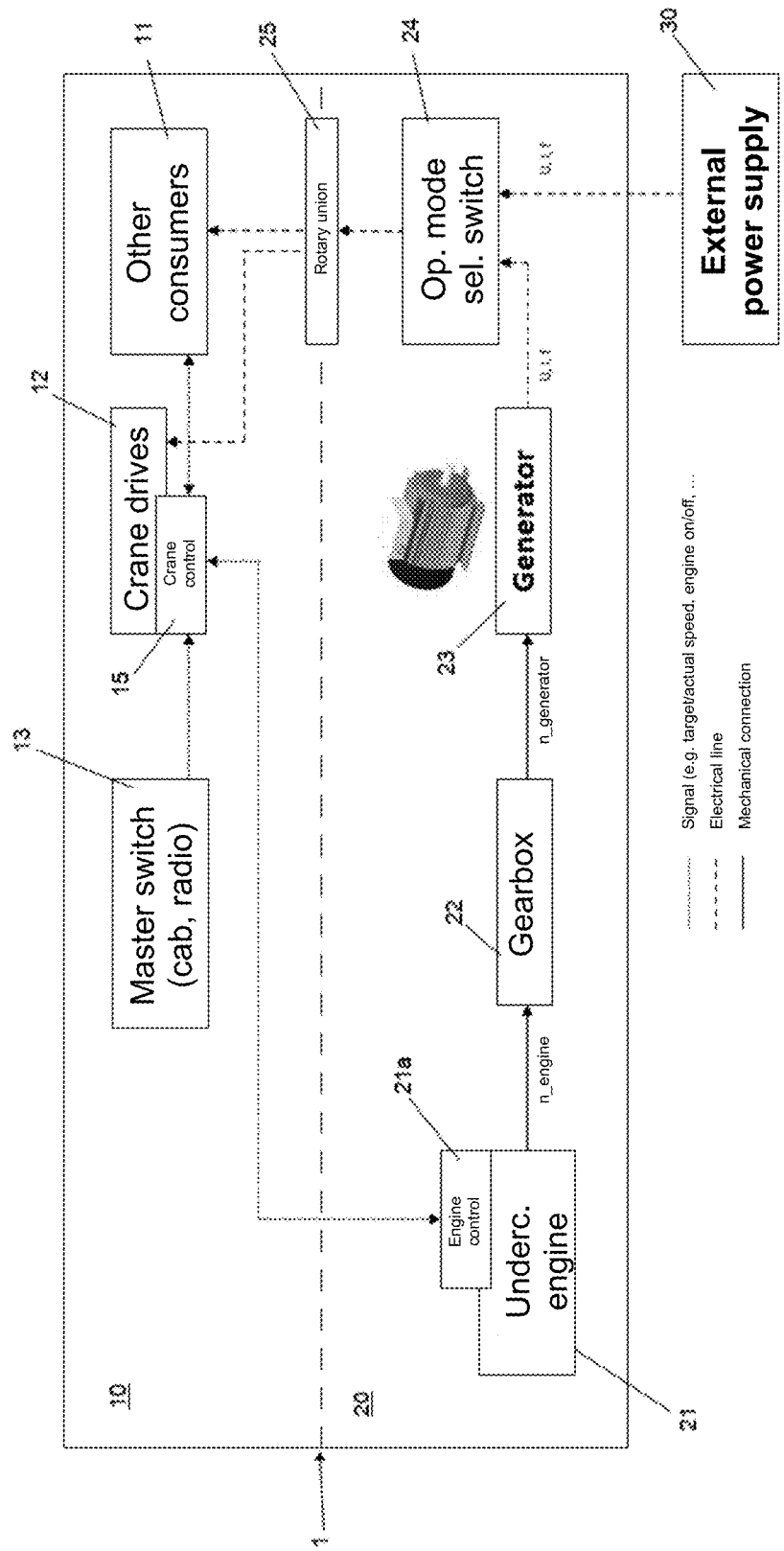

MOBILE CONSTRUCTION CRANE COMPRISING A SUPERSTRUCTURE AND AN UNDERCARRIAGE AND ONE OR MORE ELECTRICAL CONSUMERS

CROSS REFERENCE TO RELATED APPLICATIONS

The present application is a U.S. National Phase of International Application No. PCT/EP2019/078961 entitled "MOBILE CONSTRUCTION CRANE HAVING AN UPPER AND LOWER CARRIAGE AND ONE OR MORE ELECTRICAL CONSUMERS," and filed on Oct. 24, 2019. International Application No. PCT/EP2019/078961 claims priority to German Patent Application No. 10 2018 126 632.4 filed on Oct. 25, 2018. The entire contents of each of the above-listed applications are hereby incorporated by reference for all purposes.

TECHNICAL FIELD

The invention relates to a mobile construction crane comprising a superstructure and an undercarriage and one or more electrical consumers for the crane work installed at the superstructure.

BACKGROUND AND SUMMARY

Mobile construction cranes are mobile lattice mast cranes having a crane tower that is formed by a lattice structure and that stands on the superstructure. The superstructure is rotatably supported by a slewing ring on the undercarriage comprising the chassis. A lattice boom is mounted at the crane tower tip.

Mobile construction cranes are currently operated with two diesel units in accordance with a diesel-electric principle. A first diesel engine is seated in the undercarriage and forms the traction drive of the mobile construction crane. A further diesel unit is installed in the superstructure and drives a current generator likewise installed in the superstructure. The generator supplies the electrical crane drives, for example electrical winch drives, etc., that are installed in the superstructure with the required electrical power.

The two installed diesel units have to satisfy the currently applicable regulations on permitted exhaust gas emissions, which means twice the effort in the inspection. The additional diesel unit of the superstructure naturally also requires further construction space that cannot be otherwise used.

It is therefore desirable to uncover a less expensive alternative to the currently used drive concept to in particular overcome the above-named disadvantages.

This object is achieved by a mobile construction crane in accordance with the features of the independent claim(s). Advantageous embodiments of the mobile construction crane are the subject of the dependent claims.

In accordance with the invention, it is proposed for a mobile construction crane of the category comprising a superstructure and an undercarriage that the one or more electrical consumers of the mobile construction crane can be supplied with electrical energy by at least one current generator installed in the undercarriage. The generation of the required electrical energy is accordingly transposed into the undercarriage; any electrical consumers of the crane are thereby completely supplied with the required electrical energy from the undercarriage. The otherwise required additional diesel-electric drive of the superstructure can hereby be dispensed with, whereby not only costs can be saved but additional construction space likewise becomes free in the superstructure that can be used for other components. I.e. neither a current generator nor an internal combustion engine are located in the superstructure.

It is, for example, conceivable that at least one electrically driven hoisting winch of the superstructure and/or at least one electrical adjustment drive, for example to adjust a crane cab movably supported at the crane tower is/are fed by the generator of the undercarriage. The energy supply of an electrical telescopic drive, in particular for a telescopic crane tower, and/or of an electrical trolley drive is also conceivable. The required electrical energy for electronic components of the crane control or other consumers of the crane can also take place from the undercarriage. Some control panels within the crane cab, illumination means, etc. can be named purely by way of example. The provision of the required energy for all the electrical consumers of the crane takes place in the best case from the undercarriage, i.e. by the current generator installed there.

Since most electrical consumers are installed in or at the crane superstructure, electrical supply lines have to be laid from the undercarriage to the superstructure. Ideally, an already provided rotary union of the slewing ring between the superstructure and the undercarriage will be used for this purpose through which lines run from the generator to the consumers of the superstructure.

The installed current generator of the undercarriage is driven in accordance with an advantageous embodiment by an internal combustion engine, in particular a diesel unit, likewise present there. Ideally, the diesel engine of the traction drive is used for this purpose in that a gearbox output is used to drive the current generator via an interposed transfer case. A different gearbox output provides the torque required for the traction drivetrain for the locomotion of the mobile construction crane. The connection between the transfer case and the generator shaft can be implemented via a universal shaft with a cross-cut flange.

In accordance with a further advantageous aspect of the invention, the required switching electronics for the generator control are designed as an independent unit and are ideally arranged physically separate from the generator at the undercarriage. This makes possible an accessible positioning of the switching electronics in a switchgear cabinet laterally fastened to the undercarriage, for example.

In a further advantageous embodiment of the invention, the generator can be operable in a plurality of speed ranges. A control of the crane is configured for this purpose such that the speed of the internal combustion engine can be adapted via control signals to set the desired speed range of the generator. The provided output power of the generator can thereby be controlled, sensibly in dependence on the current power demands at the crane. The control can in particular detect the current power demand of the electrical consumers and can regulate the power of the internal combustion engine and thus the generator speed in dependence thereon to approximate the generated power to the power demand. Ideally, the control can directly access the engine control device of the internal combustion engine and can communicate corresponding control signals to the engine control device to set the speed.

A further advantageous aspect of the invention comprises one or more electrical consumers of the mobile crane being selectively able to be supplied with electrical energy by the generator of the undercarriage or alternatively via a separate interface of the mobile construction crane. An external energy source can, for example, be connected to the mobile construction crane by means of the interface to supply at least some of the electrical crane consumers with the required power from the external energy source. In addition, a suitable switchover means is stored at the mobile construction crane to selectively connect the supply lines of the electrical consumers to the generator or alternatively to the interface. The switchover means typically comprise electronic switching means and are preferably likewise positioned at the undercarriage.

Provision can equally well be made that an energy supply of external consumers by the current generator of the undercarriage is possible via at least one interface. In such a case, for example, the generated current of the current generator of the mobile construction crane can be utilized to supply one or more external electrical consumers with electrical energy at the site of the crane. This interface can be designed as identical to the previously named interface for the supply of the consumers internal to the crane from an external energy source or it can be designed as a separate interface.

In accordance with an embodiment variant, the current generator can be accommodated within a hollow space of the undercarriage steel frame. Such a hollow space can either be designed in a dedicated manner for the reception of the generator in the steel frame, but a hollow space anyway present can likewise be used. The support of the generator there can be either as hanging or alternatively as standing.

The generator preferably produces an electrical power of at least 30 kVa-50 kVa, ideally of approximately 40 kVa.

Further advantages and properties of the invention will be explained in detail in the following with reference to an embodiment shown in the only drawing.

BRIEF DESCRIPTION OF THE FIGURES

FIG. 1 shows a schematic sketch of the innovative diesel-electric drive concept of the mobile construction crane 1 in accordance with the invention. The sketch shows a spatial division of the crane into the superstructure region 10 and the undercarriage region 20; the regional boundary is indicated by the broken and bold line. A diesel unit 21 whose operation is regulated by the engine control device 21a is accommodated in the undercarriage 20. The provided speed n_engine at the output shaft of the diesel unit 21 is provided via a shaft connection at the transmission input of the transfer case 22.

DETAILED DESCRIPTION

A first outgoing gearbox output is connected to the traction drivetrain of the mobile construction crane 1 to provide the required torque for the traction drive of the mobile construction crane 1. A second gearbox output of the transfer case 22 is flanged to the input of the electrical current generator 23 via a universal shaft having a cross-cut flange. The current generator 23 is operated at the generator speed n_generator to provide the desired alternate voltage at the frequency f at the output. The generator 23 additionally provides a power of 40 kVA.

At the output side, the generator 23 is connected via an operating mode selection switch 24 to the electrical supply lines that are led via a rotary union 25 of the slewing ring between the superstructure and the undercarriage 10, 20. The electrical crane drives 12 such as electrical hoisting winches are supplied with energy from the generator 23 via the supply lines. The same applies to all the further electrical consumers 11 of the superstructure.

A further input of the operating mode selection switch 24 is connected to a separate supply interface of the crane. At least one external power supply 30 can be connected to this interface. The operating mode selection switch 24 provides two switch positions. In the first switch position, the generator 23 is connected to the consumers 11, 12 via the supply lines for their energy supply, while in the second switch position, there is only a connection to the interface and to an external energy source 30 connected there. In general, at least one further switch position is conceivable in which a synchronous supply of the consumers 11, 12 is possible both from the generator 23 and from the external energy source 30. It is also conceivable that the generator 23 can be connected to the interface to enable an energy supply of external consumers (not shown here) from the generator via the interface.

The central crane control 15 is communicatively connected via signal lines to the individual consumers 12, 11 and to any control input means such as a master switch 13 to in particular be able to evaluate the current power demand at the crane. This communication can take place bidirectionally. The crane control 15 communicates via a likewise bidirectional signal line with the engine control 21a of the diesel unit 21 in the undercarriage 20 to there be able to set the provided engine speed n_engine in dependence on the current power demand of the consumers 11, 12. In this respect, a plurality of speed ranges are preferably available that can, for example, be divided into a low load operation and a normal load operation.

If the surrounding construction site should also be supplied with current together with the mobile construction crane, care must be taken that the corresponding speed n_engine is set such that an electrical voltage is generated at the generator side at a stable frequency f of approximately 50 Hz to be able to provide the required supply voltage of typical electrical consumers. As a rule, this corresponds to a generator speed n_generator of 1500 revolutions per minute. The electrical energy hereby generated can then likewise be provided via the interface to the external consumers (not shown in FIG. 1).

As is drawn in FIG. 1, the generator 23 and the operating mode selection switch 24, that additionally includes further electronic components for the control of the generator 23, are designed as separate, physically isolated units that can optionally be disposed at different installation sites of the undercarriage 20. It is, for example, conceivable that the generator 23 is installed in a dedicated hollow space of the steel construction of the undercarriage 20, while the required control electronics 24 are installed in a switchgear cabinet that that is easily accessible from the outside at the undercarriage 20. An arrangement of the switchgear cabinet including the electronics at the side at the undercarriage 20 is conceivable.

The invention claimed is:

1. A mobile construction crane comprising a superstructure and an undercarriage, wherein one or more electrical consumers of the mobile construction crane are accommodated in or at the superstructure, wherein a supply of the one or more electrical consumers of the superstructure with electrical energy takes place by at least one current generator installed in the undercarriage, and wherein a switchgear cabinet for a generator control is designed as an independent unit and is arranged physically separated from the at least one current generator at the undercarriage.

2. The mobile construction crane in accordance with claim 1, wherein at least one of the one or more electrical consumers is an electrically driven hoisting winch of the superstructure, and/or an adjustment drive to adjust a crane cab movably supported at a crane tower, and/or a telescopic drive for a telescopic crane tower, and/or a trolley drive, and/or a crane control, and/or an illumination means.

3. The mobile construction crane in accordance with claim 1, wherein electrical supply lines are led from the at least one current generator via a rotary union of a slewing gear between the superstructure and the undercarriage to the one or more electrical consumers of the superstructure.

4. The mobile construction crane in accordance with claim 1, wherein the at least one current generator is drivable by at least one internal combustion engine installed in the undercarriage.

5. The mobile construction crane in accordance with claim 4, wherein the at least one current generator is drivable in a plurality of speed ranges.

6. The mobile construction crane in accordance with claim 5, wherein a control is provided and configured to select a speed range of the at least one current generator in dependence on a current power demand.

7. The mobile construction crane in accordance with claim 6, wherein the control is configured to select the speed range of the at least one current generator by transfer of a required engine speed to a control device of the at least one internal combustion engine.

8. The mobile construction crane in accordance with claim 4, wherein the at least one current generator is connected to a drive shaft of the at least one internal combustion engine via a transfer case.

9. The mobile construction crane in accordance with claim 4, wherein the at least one internal combustion engine provides the required torque for a traction drivetrain of the mobile construction crane.

10. The mobile construction crane in accordance with claim 1, wherein one or more electrical consumers of the mobile construction crane can selectively be supplied with electrical energy by the at least one generator of the undercarriage and/or via an interface for an external energy source, with the interface and/or a switchover means for switching over an energy supply positioned at the undercarriage.

11. The mobile construction crane in accordance with claim 1, wherein an interface is provided that enables an energy supply of external consumers by the at least one current generator of the undercarriage.

12. The mobile construction crane in accordance with claim 1, wherein the at least one current generator is arranged in a hollow space of a steel frame of the undercarriage, with a support of the generator there being suspended or standing.

13. The mobile construction crane in accordance with claim 1, wherein the switchgear cabinet is fastened to the undercarriage.

14. A mobile construction crane comprising a superstructure and an undercarriage, wherein one or more electrical consumers of the mobile construction crane are accommodated in or at the superstructure, wherein a supply of the one or more electrical consumers of the superstructure with electrical energy takes place by at least one current generator installed in the undercarriage, wherein the at least one current generator is drivable by at least one internal combustion engine installed in the undercarriage, wherein the at least one current generator is connected to a drive shaft of the at least one internal combustion engine via a transfer case, and wherein the connection of the at least one current generator to the transfer case takes place via a universal shaft having a cross-cut flange.

* * * * *